(12) United States Patent
Katze

(10) Patent No.: US 11,815,216 B2
(45) Date of Patent: Nov. 14, 2023

(54) SYSTEM AND METHOD FOR INSTALLING PIPE LINERS

(71) Applicants: United Pipeline Systems, Inc., Chesterfield, MO (US); UNITED PIPELINE DE MEXICO, S.A. DE C.V., El Marques (MX)

(72) Inventor: Alejandro Gutierrez Katze, Houston, TX (US)

(73) Assignees: United Pipeline Systems, Inc., Durango, CO (US); United Pipeline De Mexico, SA. DE. CV, Queretaro (MX)

( * ) Notice: Subject to any disclaimer, the term of this patent is extended or adjusted under 35 U.S.C. 154(b) by 103 days.

(21) Appl. No.: 17/351,575

(22) Filed: Jun. 18, 2021

(65) Prior Publication Data

US 2021/0396340 A1    Dec. 23, 2021

Related U.S. Application Data

(60) Provisional application No. 63/040,738, filed on Jun. 18, 2020.

(51) Int. Cl.
*F16L 55/165* (2006.01)
*F16N 7/38* (2006.01)
*F16L 55/18* (2006.01)

(52) U.S. Cl.
CPC .......... *F16L 55/1652* (2013.01); *F16L 55/18* (2013.01); *F16N 7/38* (2013.01); *F16N 2210/00* (2013.01)

(58) Field of Classification Search
CPC ......... F16L 55/1652; F16L 55/18; F16N 7/38; F16N 2210/00
USPC ........................................................ 138/98
See application file for complete search history.

(56) References Cited

U.S. PATENT DOCUMENTS

| 4,887,640 A | 12/1989 | Down |
| 5,072,622 A | 12/1991 | Roach et al. |
| 5,205,671 A * | 4/1993 | Handford .............. E21B 19/086 405/184 |
| 5,205,886 A | 4/1993 | White |
| 5,306,449 A | 4/1994 | Brittain et al. |
| 5,320,388 A | 6/1994 | Lacy et al. |
| 5,626,801 A | 5/1997 | Mcmiilan et al. |
| 5,645,784 A | 7/1997 | Mcmiilan et al. |

(Continued)

FOREIGN PATENT DOCUMENTS

| CA | 2098219 C | 1/1999 |
| CA | 2171689 C | 9/1999 |

(Continued)

OTHER PUBLICATIONS

Indian Patent No. 256792, Varadachari et al., A Method of Designing Internal Spiral Ribs and Spiral Ribs Duct Thereof, dated Jul. 30, 2013, URL: <http://www.allindianpatents.com/patents/256792-a-method-of-designing-internal-spiral-ribs-and-spiral-ribs-duct-thereof>.

*Primary Examiner* — Craig M Schneider
*Assistant Examiner* — David R Deal
(74) *Attorney, Agent, or Firm* — Stinson LLP

(57) ABSTRACT

A method and apparatus for moving pipe rehabilitation objects, such as a pipe liner through a host pipeline. Flexible tubing is used to connect to the pipe rehabilitation object and to apply a force to cause the pipe rehabilitation objection to move through host pipeline. The flexible tubing is also capable of conveying a fluid, such as a lubricant through the tubing.

9 Claims, 8 Drawing Sheets

(56) References Cited

U.S. PATENT DOCUMENTS

| | | | |
|---|---|---|---|
| 6,058,978 A | 5/2000 | Paletta et al. | |
| 6,523,574 B1 | 2/2003 | Taylor | |
| 6,601,600 B1 | 8/2003 | Taylor | |
| 6,935,376 B1 * | 8/2005 | Taylor | F16L 55/1652 138/104 |
| 2002/0157718 A1 | 10/2002 | Mason | |
| 2009/0205733 A1 | 8/2009 | Stringfellow et al. | |

FOREIGN PATENT DOCUMENTS

| | | |
|---|---|---|
| CA | 3012146 | 1/2020 |
| WO | 2007144899 A2 | 12/2007 |

* cited by examiner

SYSTEM AND METHOD FOR INSTALLING PIPE LINERS

CROSS-REFERENCE TO RELATED APPLICATIONS

This application claims priority to U.S. Provisional Application No. 63/040,738, filed Jun. 18, 2020, the entirety of which is hereby incorporated by reference.

FIELD

This disclosure generally pertains to systems and methods for installing compression-fit polymer liners into a host pipeline.

BACKGROUND

Polymer pipe liners can be positioned inside a host pipeline to provide a barrier between the host pipeline and the fluid flowing through it. Certain polymer pipe liners comprise thermoplastic tubes (e.g., HDPE tubes) that are compression-fit inside an existing host pipeline. In a typical process, a long thermoplastic tube is pulled into the host pipeline by a winch. As the liner is pulled into the host pipeline, rollers elastically deform the liner to reduce the diameter of the liner. The pulling forces impart tension that prevents the liner from rebounding so that the reduced diameter of the liner is maintained as the liner is pulled into the host pipeline. But even with the reduced diameter, the contact area between the liner and the host pipeline remains large. Hence, frictional resistance to movement of the liner through the host pipeline can be high. After the pull-in is complete, the thermoplastic tube resiliently expands toward its original diameter, pressing radially outward against the wall of the host pipeline and forming a compression fit.

SUMMARY

In one aspect of the present invention, a method of moving a pipe rehabilitation object through a host pipe generally comprises moving the pipe rehabilitation object into a host pipeline by tubing connected to the pipe rehabilitation object. Lubricant is delivered through the tubing to lubricate an inner surface of the host pipeline.

In another aspect of the present invention, a system for moving pipe rehabilitation objects through a host pipeline generally comprises a lubrication dispenser configured to dispense lubricant onto an interior surface of the host pipeline from within the host pipeline, and a lubricant tank. Flexible tubing is configured to provide fluid communication from the lubricant tank to the lubrication dispenser within the host pipeline, and is further configured to be connected to a pipe rehabilitation object. The flexible tubing can also move the pipe rehabilitation object within the host pipeline as the flexible tubing is moved along the host pipeline. A pump can pump lubricant from the lubricant tank through the flexible tubing so that the lubricant is dispensed from the lubrication dispenser when the flexible tubing is connected to the pipe rehabilitation object and moves along the host pipeline to thereby lubricate the interior surface of the host pipeline.

In another aspect of the present invention, a system for moving pipe rehabilitation objects through a host pipeline generally comprises flexible tubing configured to carry fluid internally through the tubing. The flexible tubing is configured to connect to a pipe rehabilitation object. Apparatus is configured to move the flexible tubing through the host pipeline thereby to simultaneously move the pipe rehabilitation object through the host pipeline.

In yet another aspect of the present invention, a method of installing a liner comprising a polymer tube generally comprises moving flexible tubing along an interior of a host pipeline; and operating a host pipeline preparation or inspection apparatus operatively connected to a distal end portion of the flexible tubing. The flexible tubing is connected to a leading end of the liner, and the liner is pulled into the host pipeline by the flexible tubing connected to the leading end of the liner.

In a further aspect of the present invention, a system for installing a liner comprising a polymer tube into a host pipeline generally comprises a host pipeline preparation or inspection apparatus. Flexible tubing is configured to be operatively connected to the host pipeline preparation or inspection apparatus to move the host pipeline preparation or inspection apparatus along an interior of the host pipeline and to facilitate operation of the host pipeline preparation or inspection apparatus. The flexible tubing is further configured to be connected to a leading end of the liner and for pulling the liner into the host pipeline as the flexible tubing is moved along the host pipeline.

In a further aspect of the present invention, a method of installing a liner comprising a polymer tube generally comprises delivering fluid in tubing to a sealed longitudinal section of a host pipeline to test hydrostatic pressure capacity of the longitudinal section of the host pipeline. The tubing is connected to a leading end of the liner, and the liner is pulled into the host pipeline by the tubing connected to the leading end of the liner.

In yet a further aspect of the present invention, a system for installing a liner comprising a polymer tube into a host pipeline generally comprises a hydrostatic testing seal configured to seal a longitudinal section of the host pipeline, and a source of pressurized fluid. Flexible tubing is configured to provide fluid communication from the source of pressurized fluid to the sealed longitudinal section of the host pipeline when the hydrostatic testing seal seals the longitudinal section of the host pipeline. The flexible tubing is further configured to be connected to a leading end of the liner for pulling the liner into the host pipeline as the flexible tubing is moved along the host pipeline.

In a still further aspect of the present invention, a method of installing a liner comprising a polymer tube generally comprises connecting flexible tubing to a leading end of the liner. A strain gauge is affixed on a pull head attached to the liner. A communication line extends along the flexible tubing to the strain gauge. The liner is pulled into the host pipeline by the tubing connected to the leading end of the liner. While pulling the liner into the host pipeline, a signal is output from the strain gauge representing strain on the liner to a control and/or monitoring device via the communication line extending along the flexible tube.

Other objects and features of the present invention will be in part apparent and in part pointed out hereinafter.

BRIEF DESCRIPTION OF THE DRAWINGS

FIG. 3 is a schematic illustration of another implementation of the installation system in which the system is configured for preparing the host pipeline for pull-in;

FIG. 5 is a schematic illustration of another implementation of the installation system in which the system is configured for directly measuring strain on the liner during pull-in;

Corresponding reference characters indicate corresponding parts throughout the drawings.

DETAILED DESCRIPTION

An exemplary embodiment of a polymer liner suitable for being compression fit inside an existing host pipeline is described in detail in Canadian Patent Application No. 3012146, which is hereby incorporated by reference in its entirety. This disclosure generally pertains to systems and methods of installing polymer liners of the type disclosed therein. That is, this disclosure generally pertains to systems and methods for installing polymer liners that are to be compression-fit inside an existing host pipeline. Liners in the scope of this disclosure comprise tubes of cured polymer material that are capable of being deformed to a reduced cross-sectional dimension configuration while the liner is pulled into the interior of the host pipeline and then caused to resiliently rebound to engage the interior of the host pipeline in a compression fit. Those skilled in the art will appreciate that these types of liners are distinct from cured-in-place liners that are positioned along the host pipeline in an uncured condition and then are cured in place.

Canadian Patent Application No. 3012146 describes methods of installing a compression-fit polymer liner in which lubricant is injected along the external grooves of the liner through a fitting coupled to the insertion end of the host pipeline as the liner is being pulled into the interior of the host pipeline. Depositing lubricant into the interface between the liner and the host pipeline in this fashion has been found to reduce static and dynamic friction at the interface, which facilitates easier pull-in of liners of longer lengths by reducing pulling forces.

Figure 6:
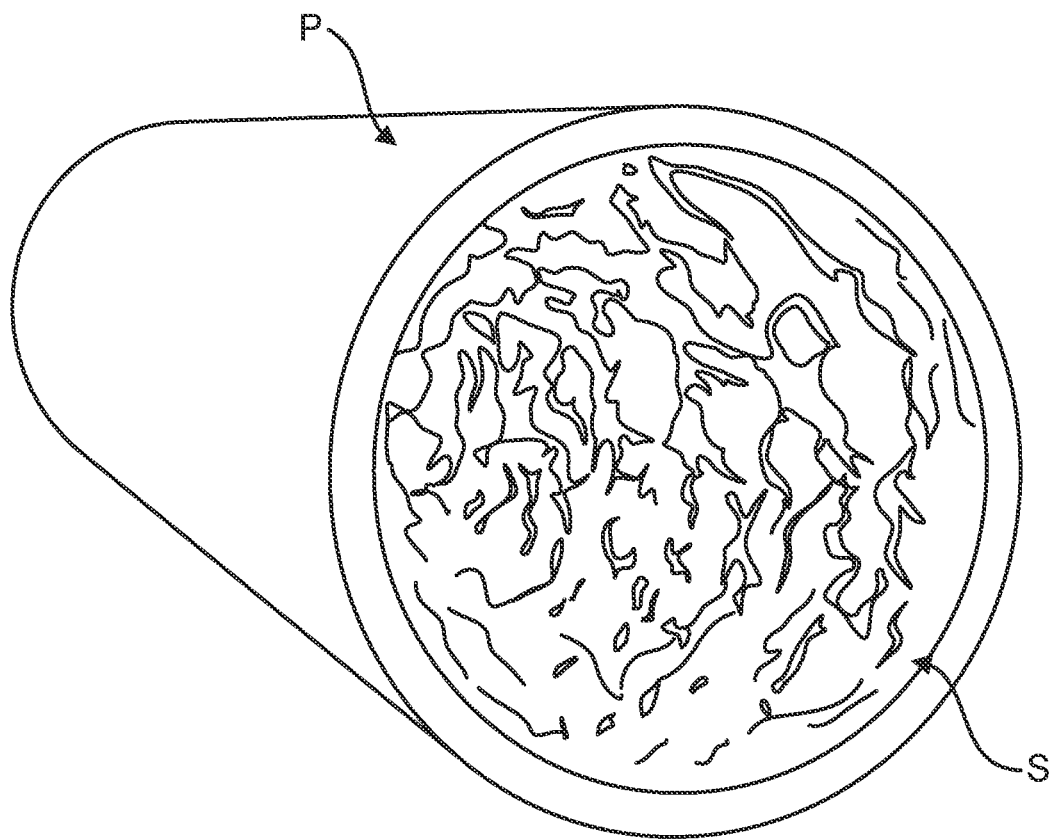
FIG. 6 is a schematic illustration of a segment of a host pipeline with scale buildup along the interior.
Figure 7:
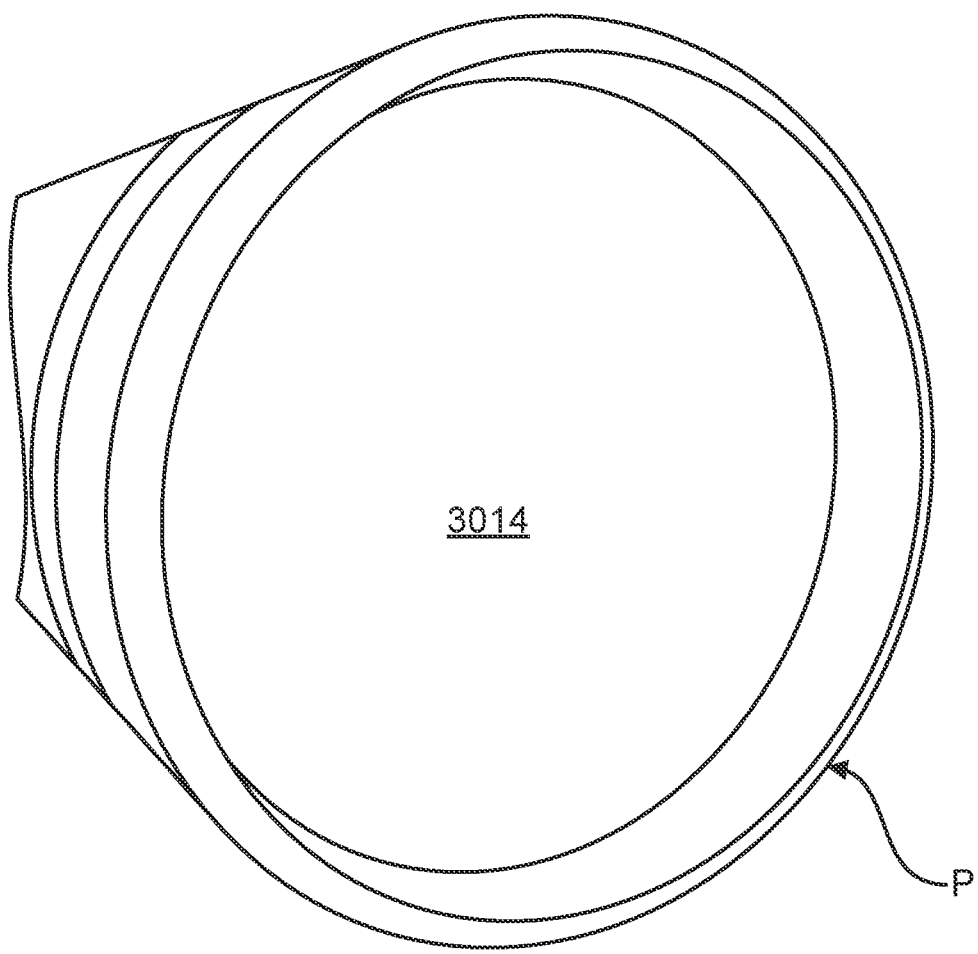
FIG. 7 is a schematic illustration of a host pipeline that includes a coupling that protrudes into the interior of the pipeline.
Figure 8:
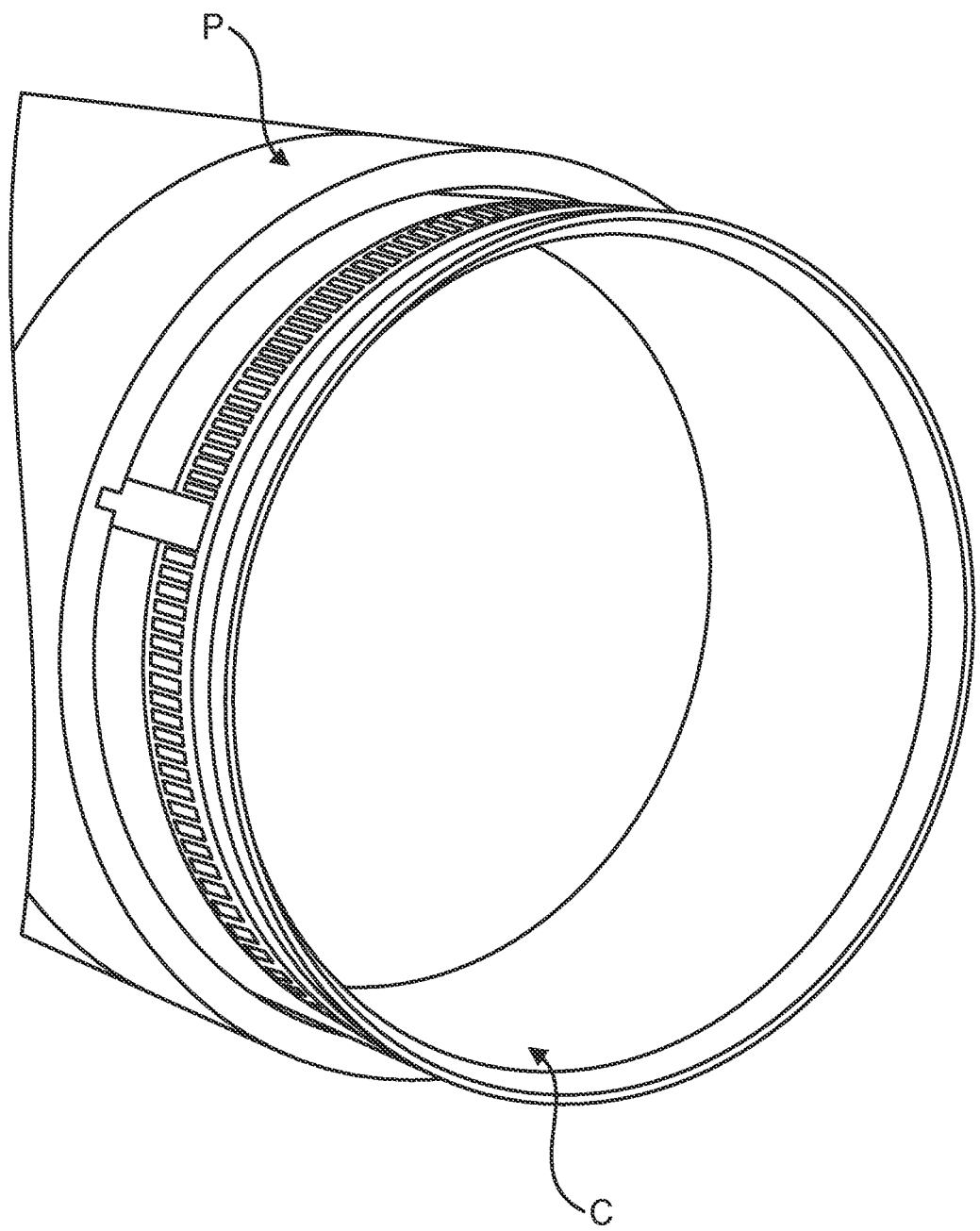
FIG. 8 is a schematic illustration of another segment of a host pipeline that includes a coupling that protrudes into the interior of the pipeline.

The present inventors have further found, however, that the methods of installing a compression-fit polymer liner disclosed in Canadian Patent Application No. 3012146 may not always be effective when pulls of very great lengths are required. When the lubricant is injected from the end of the host pipeline into which the liner is inserted and long lengths of the liner begin to be received in the pipeline, it becomes difficult to force the lubricant to flow along the entire length of liner moving within the host pipeline. Furthermore, the present inventors have recognized other challenges attendant to installing a compression-fit polymer liner that were not specifically addressed in Canadian Patent Application No. 3012146. For example, scale S and residue can build up on the interior surface of a host pipeline P (e.g., as by buildup of paraffin and carbonate that might be carried in the transported liquid) as depicted in FIG. 6, which can interfere with liner pull-in. Other obstructions to the liner, such as weld slag WS may be present. Likewise, internally protruding host pipeline couplings C can interfere with a polymer liner as it is being pulled into a host pipeline P, as shown in FIGS. 7 and 8. Furthermore, existing pipe liner installation methods utilize a strain gauge on a pull cable to ensure that the tensile strength of the liner is not exceeded. However, the inventors have recognized that tension in the pull cable may not accurately reflect tension on the liner, and as such, existing systems may not provide an accurate representation of when the forces imparted on the liner during pull-in begin to approach or exceed the physical limitations of the liner. In very long pulls, the cables used to pull the liner can abrade and damage the host pipe. Finally, the inventors have recognized that, in circumstances in which hydrostatic testing is required along a discrete segment of an existing host pipeline, the only known methodology is to hydrostatically test an entire span of host pipeline. This testing method requires more fluid, time, and energy than would be required if only the discrete longitudinal section of pipeline of interest were subjected to hydrostatic testing.

As will be explained in further detail below, the inventors have recognized that solutions to each of the above-described technical problems can, in part, be realized by utilizing flexible tubing inside the host pipeline. In particular, the flexible tubing described herein may comprise coiled steel pipeline of the type that is used in hydraulic fracturing processes. As will be explained in further detail below, the flexible tubing may be operatively connected to various different working apparatuses or operating heads before or while being operatively connected to the leading end of a compression-fit polymer liner for pulling the liner into the host pipeline. In certain embodiments, the flexible steel tubing entirely replaces the conventional steel cables in all aspects of the process of installing a compression-fit polymer liner into a host pipeline. Replacing the conventional steel cables with the flexible tubing, especially during the installation of long sections of pipe liner, is thought to substantially reduce the risk of damaging or cutting through the host steel pipeline while the liner is being pulled into position.

FIGS. 1-5 depict various implementations of a system for installing a compression-fit polymer liner L (FIGS. 2 and 5), wherein the system is generally indicated at reference number 10 and the liner is indicated at L. In general, the system comprises a coiled tubing unit 12 that includes a spool mechanism (shown in FIG. 1), a pipeline standoff apparatus 11 that allows the flexible tubing to enter the existing steel pipeline P without entanglement or damage to the flexible tubing 14 and a length of flexible tubing 14 configured to be wound onto a spool of the spool mechanism. In one embodiment, the flexible tubing 14 is made of steel. For clarity, only the coiled tubing 14 is depicted in the drawings. The spool mechanism is positioned outside of a host pipeline P adjacent a control cab 16 of the system 10. As explained above, the flexible tubing 14 may comprise a steel tubing of the type used in hydraulic fracturing processes. The flexible tubing 14 has a proximal end portion connected to the coil mechanism and a distal end portion that is configured to move into and along the host pipeline P. As will be explained in further detail below, the tubing 14 is configured to provide one or both of fluid and signal communication between first equipment positioned outside of the host pipeline and second equipment configured to (i) be connected to the distal end portion of the tubing and (ii) move with the tubing along the interior of the host pipeline P. While the spool mechanism is not shown in the drawings, those skilled in the art will appreciate that any spool mechanism of the type used with flexible steel pipeline in hydraulic fracturing processes may likewise be used in the system 10. In general, a suitable spool mechanism of the coiled tubing unit 12 can comprise a spool and a driver that is configured to rotate the spool (i) in a first direction to let out tubing 14 from the spool so that it advances lengthwise into and along the host pipeline and (ii) in a second direction to coil tubing onto the spool so that the tubing withdraws lengthwise from the host pipeline.

Figure 1:
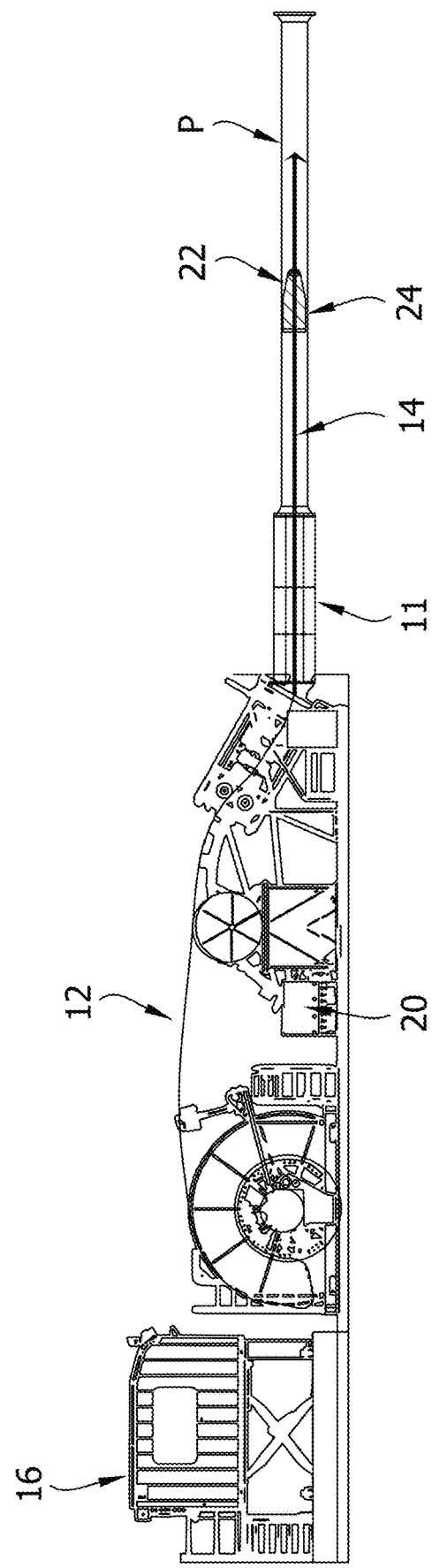
FIG. 1 is a schematic illustration of an implementation of an installation system for a compression-fit polymer pipe liner in which the system is configured for lubricating the host pipeline.

Referring to FIG. 1, in one implementation, the system 10 is configured for lubricating the interior of a host pipeline P before pulling the liner L into the host pipeline. In the implementation depicted in FIG. 1, the system 10 comprises a lubricant source 20 comprising a tank (or other vessel) containing lubricant and a lubricant pump (not shown). The proximal end portion of the tubing 14 is fluidly connected to the lubricant source 20 such that the lubricant pump can pump lubricant from the tank into and through the tubing. The system 10, as implemented in FIG. 1, further comprises a lubricant dispenser 22 fluidly connected to the distal end portion of the tubing 14. As illustrated, the tubing 14 provides fluid communication between the lubricant source 20 and the lubricant dispenser 22 such that the lubricant pump can pump lubricant from the lubricant tank through the tubing and dispense lubricant through the dispenser. Thus, the installation system 10 is configured so that lubricant is pumped from the lubrication tank 20 connected to the coiled tubing unit 12, through the tubing 14, to the lubrication dispenser 22. In certain embodiments, the operator inside of the control cab 16 can control the flowrate at which lubricant is dispensed by the lubrication dispenser 22 by increasing or decreasing the pump output. The tubing 14 is constructed to carry liquid or flowable material. Therefore, resistance to flow is minimized over the very long distances. In FIG. 1, the dispenser 22 is configured to dispense the lubricant radially outward relative to the center axis of the host pipeline P such that the lubricant is generally evenly applied to the interior surface of the host pipeline. In an exemplary embodiment, a pull head 24 is located at the distal end portion the lubricant dispenser 22 so that the tubing 14 may be used to pull the liner L into the host pipeline P.

In one or more embodiments the lubricant used is formulated to contain corrosion inhibiting components to further protect the existing steel pipeline P.

An exemplary method of using the system 10 as illustrated in FIG. 1 will now be described. Initially, the coiled tubing unit 12 is actuated to advance the distal end portion of the tubing 14, with attached dispenser 22, into a first end portion of the host pipeline. As the coiled tubing unit 12 advances the coiled tubing 14 lengthwise toward an opposite second end portion of the host pipeline P, the lubricant source 20 pumps lubricant through the tubing and the dispenser 22 dispenses the lubricant onto the interior surface of the host pipeline. The lubrication dispenser 22 evenly dispenses lubricant radially outward to the walls of the host pipeline P, providing a low-friction surface prior to the installation of the compression-fit polymer liner L. When the dispenser 22 reaches the second end portion of the host pipeline P, the pull head 24 is coupled to the leading end portion of the liner L. The coiled tubing unit 12 then coils the tubing 14, causing the tubing and the dispenser 22 to withdraw lengthwise toward the first end portion of the host pipeline P. As the tubing 14 and the dispenser 22 move lengthwise toward the first end portion of the host pipeline P, the liner L is simultaneously pulled into the host pipeline. Because the dispenser 22 has lubricated the pipeline P immediately before the liner L is pulled into the pipeline, the applied lubricant reduces the static and dynamic coefficients of friction between the pipeline and the liner. This reduces the required pulling forces and enables longer lengths of liners to be pulled without exceeding the tensile strength of the liner material.

Figure 2:
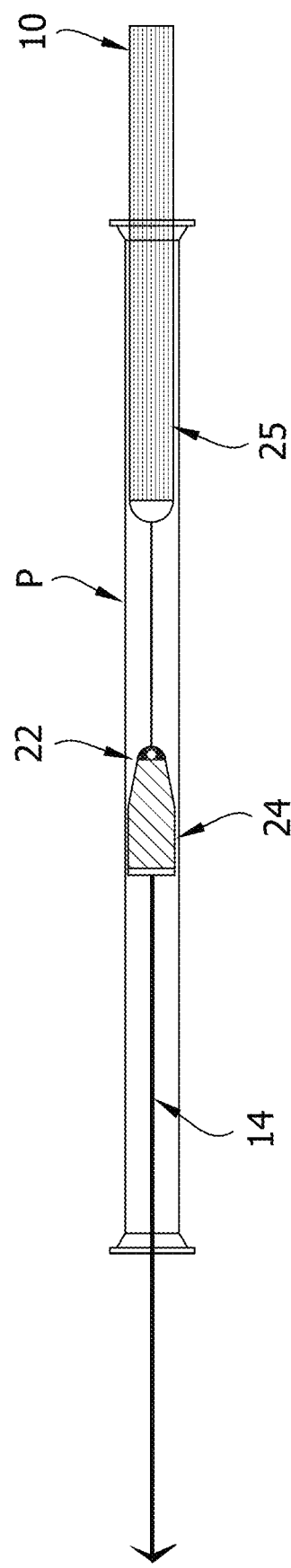
FIG. 2 is a schematic illustration of another implementation of the installation system in which the system is configured for lubricating the interface between the host pipeline and the liner as the liner is being pulled into the host pipeline.

Referring now to the implementation of the liner installation system 10 depicted in FIG. 2, in one or more embodiments, the system is configured to apply lubricant to the host pipeline P while the system is pulling the liner L into the host pipeline P. Simultaneous application of lubricant may be performed as an alternative or as a supplement to the process of applying lubricant before pulling the liner L through the host pipeline P described above in reference to FIG. 1. As in the implementation in FIG. 1, in FIG. 2, the system 10 comprises the coiled tubing unit 12, the control cab 16, and the lubrication components 20, 22. It is contemplated that, in the implementation of FIG. 2, the lubricant dispenser 22 may be configured to discharge the lubricant so that it flows radially outward and longitudinally toward liner L coupled to the pull head 24. It is believed that the implementation shown in FIG. 2 is particularly well-suited for use with pulling grooved liners of the type disclosed in Canadian Patent Application No. 3012146, since the grooves may provide an effective mechanism for distributing lubricant and allowing the lubricant to flow longitudinally along the liner L during installation. As explained in Canadian Patent Application No. 3012146, grooved polymer pipe liners also have reduced contact area with the host pipeline P, which reduces the static and dynamic coefficients of friction in comparison with comparable liners lacking longitudinal grooves.

An exemplary method of using the system 10 as illustrated in FIG. 2 will now be described. Initially, the coiled tubing unit 12 is actuated to push the distal end portion of the tubing 14, with attached dispenser 22, into a first end portion of the host pipeline going through the pipeline standoff apparatus 11 which provides separation from the coiled tubing unit 12 and the host pipeline P. The tubing 14 is pushed through the host pipeline P until the dispenser 22 reaches the second end portion of the host pipeline P, at which point the pull head 24 is coupled to the leading end portion of the liner L. The coiled tubing unit 12 then begins to wind up or coil the tubing 14, causing the tubing and the dispenser 22 to withdraw lengthwise toward the first end portion of the host pipeline P. As the tubing 14 and the dispenser 22 move lengthwise toward the first end portion of the host pipeline P, the liner L is simultaneously pulled into the host pipeline. Furthermore, while the liner L is being pulled into the host pipeline P, lubricant from the lubricant source 20 is pumped through the tubing 14 and the dispenser 22. The dispenser dispenses the lubricant onto the interior surface of the host pipeline P as the liner L is being pulled into the host pipeline. The lubricant dispenses onto the interior surface of the host pipeline P immediately in front of the liner L or at the leading end portion of the liner. As a result, the lubricant is always applied to the interface between the liner L and the host pipeline P at the leading end portion, regardless of the length of liner being pulled into place. In an exemplary embodiment, external grooves on the liner L channel the lubricant lengthwise along the liner L so that lubricant is applied along the entire length of the liner received in the host pipeline P 25.

The lubrication provided by the installation system 10 as depicted in FIGS. 1 and 2 can reduce the friction between the liner L and the host pipeline P during pull-in. Reducing the friction between the liner L and the host pipeline P reduces the required pulling force per unit length of liner being installed. This is thought to allow for longer installation lengths before the tensile load limits are reached for the pipe liner L.

Figure 3:
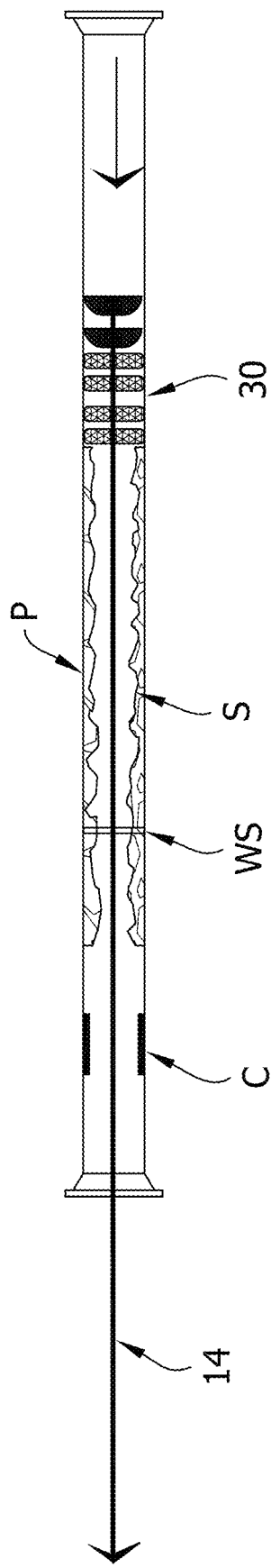

Referring to FIG. 3, in another implementation of the installation system 10, a pipeline preparation apparatus 30 is installed on the distal end portion of the coiled tubing 14. In the illustrated embodiment, the pipeline preparation apparatus 30 is a hydraulic apparatus powered by hydraulic fluid (broadly, an operating fluid) directed from a source (now shown) located outside the pipeline P, through the tubing 14, to the apparatus located inside the pipeline. Hydraulic pipeline preparation apparatuses in the scope of this disclosure include, but are not limited to, hydraulically powered rotary grinding, abrasion, or cutting apparatuses for removing scale S or other protruding structures on the interior of the host pipeline P. Hydraulic pipeline preparation apparatuses in the scope of this disclosure further include hydraulically powered rotary cleaning devices (e.g., rotary cleaning or polishing brushes) for cleaning the interior surface of the host pipeline. Other pipeline preparation apparatuses such as pneumatically powered apparatuses and high pressure sprayers are also contemplated to be within the scope of this disclosure. By using a hydraulically powered pipeline preparation apparatus 30 (or other type of pipeline preparation apparatus) before the liner L is inserted, the pipeline P can be cleaned of residue or scale and/or obstructions can be ground or removed. It is believed that this can allow compression-fit polymer liners L to be installed inside pipelines P where installation has heretofore required excavation and replacement of pipeline sections due to internal features that obstruct insertion of the liner, such as internally protruding pipeline couplers, scale buildup, or other types of residue buildup.

An exemplary method of using the system 10 as illustrated in FIG. 3 will now be described. Initially, the coiled tubing unit 12 is actuated to advance the distal end portion of the tubing 14, with attached pipeline preparation apparatus 30, into a first end portion of the host pipeline P. The coiled tubing unit 12 via that tubing 14 is able to push the pipeline preparation apparatus 30 the full length of the host pipeline P. As the tubing 14 and the apparatus 30 move lengthwise toward the second end portion of the host pipeline P, the apparatus 30 may be used to remove any internally protruding structures from the wall of the host pipeline P. Thus, when there is scale buildup along a continuous length of the host pipeline P, for example, the apparatus 30 is operated continuously as it advances along the length of the pipeline. When the apparatus 30 is being used to remove discrete protruding elements, such as a plurality of pipeline couplings C (FIGS. 7 and 8) spaced apart along the length of the pipeline P, the apparatus 30 is advanced to each respective location and then operated at the respective location to remove the discrete obstruction. After the protruding structures have been removed, the coiled tubing unit 12 can withdraw the tubing 14 and the apparatus 30 from the pipeline P. In other embodiments, the apparatus 30 can be a pipe inspection apparatus capable of examining the pipe to determine some aspect of the pipeline. The liner L and the apparatus 30 are considered "pipe rehabilitation objects" for the purpose of the present disclosure. Subsequently, the apparatus 30 can be replaced with the lubrication dispenser 22 and then the system can be used as described above to pull in the liner L under lubricated conditions. It is contemplated that separate coiled tubing units 12 can be used for the hydraulic pipeline preparation apparatus 30 and the lubrication dispenser 22 or that these two operating heads can be used interchangeably with the same coiled tubing unit.

Figure 4:
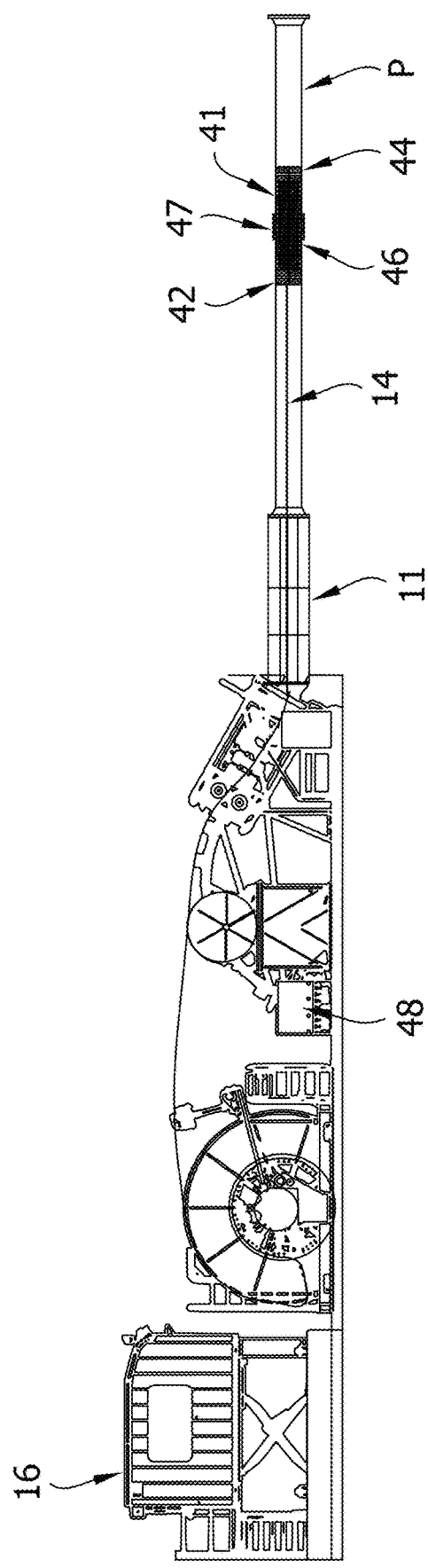
FIG. 4 is a schematic illustration of another implementation of the installation system in which the system is configured for performing hydrostatic testing of a discrete longitudinal segment of the host pipeline.

Referring to FIG. 4, in another implementation of the installation system 10, a retrievable hydrostatic testing seal 40 is operatively connected to the distal end portion of the coiled tubing 14. The retrievable hydrostatic testing seal 40 is generally configured to move with the distal end portion of the tubing 14 along the interior of the host pipeline P. Furthermore, the retrievable hydrostatic testing seal 40 is configured to seal a discrete longitudinal section of the host pipeline. For example, this may be at a location along the pipe P where there was a repair of the pipe (e.g., such as at the repair 47 shown in FIG. 4), or performance testing is otherwise desired. The sealed discrete longitudinal section of the host pipeline allows for performance of a hydrostatic test within the discrete longitudinal section of the host pipeline using a hydrostatic test apparatus 41. In one or more embodiments, the retrievable hydrostatic testing seal 40 comprises a proximal seal element 42 and a distal seal element 44 spaced apart from the proximal seal element along the length of the pipeline P. Each of the proximal and distal seal elements 42, 44 is configured to form a fluid seal of the pipeline P at the respective location along the length of the pipeline. The proximal and distal seal elements 42, 44 are spaced apart lengthwise such that they are configured to define a sealed chamber 46 therebetween.

The distal end portion of the tubing 14 is mechanically connected to the hydrostatic testing seal 40 so that the hydrostatic testing seal moves with the distal end portion of the tubing as the coiled tubing apparatus 12 advances and retracts the tubing along the pipeline P. The distal end portion of the tubing 14 also extends through the proximal seal element 42 and is thereby fluidly connected to the chamber 46. The proximal end portion of the tubing 14 is fluidly connected to a fluid source 48 such as a water tank and a pump (not shown) configured to pump the water from the water tank, through the tubing 14, to the sealed chamber 46 to thereby pressurize the chamber. A pressure sensor is operatively connected to the tubing 14 to detect a pressure in the tubing and sealed chamber 46 during hydrostatic testing. To perform hydrostatic testing of a discrete longitudinal segment of the host pipeline P, the pump pumps fluid from the fluid source 48 into the chamber 46 until the pressure sensor detects a desired pressure. If no leaks form along the segment of the pipeline P defining the chamber 46, the discrete longitudinal segment of the host pipeline P is determined to pass hydrostatic testing.

In certain embodiments, the seal elements 42, 44 can be adjustable (e.g., inflatable or mechanically expandable) from reduced cross-sectional size configuration (not shown) to an expanded configuration shown in in FIG. 4. Suitably, in the reduced cross-sectional size configuration, the cross-sectional dimensions of the seal elements 42, 44 are less than the internal dimensions of the host pipeline P so that the seal elements can move easily along the interior of the host pipeline. In the expanded configuration, the seal elements 42, 44 are sized to firmly engage the inner wall of the host pipeline about the entire inner perimeter to form high pressure fluid seals at the respective locations.

In other embodiments the seal elements 42, 44 can be constructed of flexible elastomeric material configured (1) to sealingly engage the inner perimeter of the host pipeline P when the chamber 46 is internally pressurized and (2) to deform when the coiled tubing apparatus 12 advances or retracts to allow the hydrostatic testing seal 40 to move lengthwise along the interior of the host pipeline with the distal end portion of the tubing 14.

An exemplary method of using the system 10 as illustrated in FIG. 4 will now be described. In at least some embodiments, before the system 10 is used, a discrete longitudinal section of the host pipeline may be repaired, for example, by an external cured-in-place liner R. Those skilled in the art will appreciate that it may be helpful to perform hydrostatic testing of the discrete longitudinal section that was repaired. In conventional methods of performing hydrostatic testing, the entire length of pipeline P between the first access point at the first end portion and the second access point at the second end portion would be sealed off and pressurized to perform the necessary testing. However, this process requires large expenditures of time, water, and energy. For example, although only the short longitudinal section subject to the repair R requires testing, the remainder of the pipeline P is subjected to the same conditions during the conventional testing process. All of the resources that are applied to pressurizing the remainder of the pipeline are essentially wasted. The installation system 10 can mitigate the waste inherent in conventional hydrostatic testing systems.

Initially, the coiled tubing unit 12 is actuated to advance the distal end portion of the tubing 14, with attached hydrostatic testing seal 40, into a first end portion of the host pipeline P. The hydrostatic testing seal 40 is then advanced to the discrete longitudinal section of the pipeline P including the repair R. In particular, the coiled tubing unit 12 positions the hydrostatic testing seal 40 so that proximal seal element 42 is spaced apart proximally of the repair R and the distal seal element 44 is spaced apart distally of the repair. Subsequently, fluid from the fluid source 48 is pumped into the sealed chamber 46. The user (or an automatic testing control system) simultaneously monitors the pressure sensor and the exterior of the discrete longitudinal segment of the pipeline P under test. If the user identifies any leaks in the discrete longitudinal segment of the pipeline P while the chamber 46 is being pressurized, the discrete longitudinal segment of the pipeline is determined to fail hydrostatic testing and further repairs are made. If no leaks form after the pressure sensor registers the desired pressure (and, in some cases, the desired pressure is sustained for a predetermined period of time), the discrete longitudinal segment of the pipeline P is determined to pass hydrostatic testing.

After a discrete longitudinal segment of the pipeline P is tested, the coiled tubing unit 12 can advance the testing seal 40 to another longitudinal segment in need of testing where the process is repeated. Alternatively, the coiled tubing unit 12 can withdraw the tubing 14 and testing seal 40 from the pipeline P. After the hydrostatic testing seal 40 is removed, the user can replace it with the lubrication dispenser 22 or the pipeline preparation apparatus 30 and then the system can be used as described above to prepare the pipeline for lining and/or to pull in the liner L under lubricated conditions. Again, it is contemplated that different coiled tubing units 12 can be used for the hydrostatic testing seal 40, the pipeline preparation apparatus 30, and the lubrication dispenser 22, or alternatively, these operating heads can be used interchangeably with one or more of the same coiled tubing units.

Figure 5:
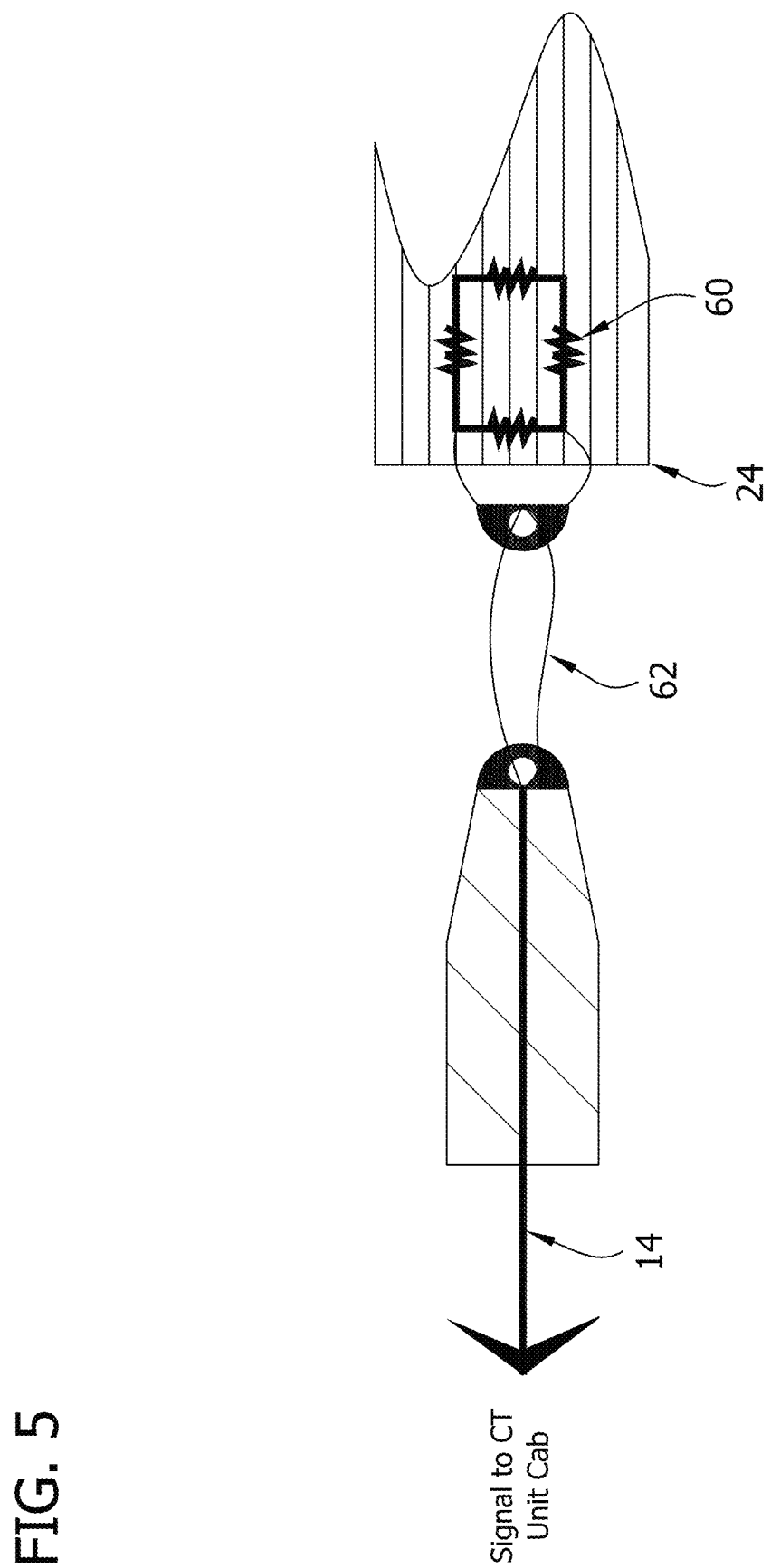

Referring to FIG. 5, in one or more embodiments, the installation system 10 can be configured to directly measure the strain on the liner L as the liner is being pulled into the host pipeline P. FIG. 5 schematically illustrates a pulling head 24 on the distal end portion of the tubing 14. The pulling head 24 may be integrated into the lubricant dispenser 22 as explained above. Alternatively, the pulling head may be integrated into another operating component or may comprise a dedicated, standalone device. In the illustrated embodiment, the installation system 10 comprises a strain gauge 60 (e.g., a Wheatstone bridge) directly on the pulling head 24 such that the strain gauge is configured to measure the strain on the liner caused by the pulling forces. In the illustrated embodiment, the installation system 10 further comprises a communication line 62 that extends from a first end portion connected to the strain gauge, along the tubing 14, to a second end portion connected to a control and/or monitoring device located outside of the main pipeline P (e.g., in the control cab 16 shown in FIG. 1). The strain gauge 60 outputs a signal representative of the strain on the liner L, and the communication line 62 extending along the tubing 14 carries the signal to the control/monitoring device so that the user or an automatic control system can determine directly when the strain on the liner approaches or exceeds known mechanical limits of the liner material. Thus, during use of the system 10 as depicted in FIG. 5, while the liner L is being pulled into the host pipeline P (e.g., using the lubrication techniques described above in reference to FIGS. 1 and 2), the user or an automatic control system monitors the signal output from the strain gauge 60 to determine when strain on the liner L approaches or exceeds a predetermined level associated with the known mechanical limits of the liner material.

As can be seen, the compression fit liner installation system 10 can provide numerous advantages over conventional systems. For example, the system 10 utilizes flexible tubing 14 instead of conventional steel cable, which is thought to reduce the probability of damaging the host pipeline P during the pull-in process. Furthermore, the flexible tubing 14 allows lubricant, operating fluid (e.g., hydraulic fluid), and/or signals to be conveyed between locations outside of the pipeline P and locations inside the pipeline along the same structure that is used for pulling in the liner L. As explained above, the system 10 can be implemented with a single coiled tubing unit 12 and a plurality of interchangeable operating heads 22, 30, 40 or alternatively can be implemented using a plurality of coiled tubing units with dedicated operating heads for each of the tools. Still further it is contemplated that the operating heads 22, 30, 40 could be adapted to be simultaneously connected to a single coiled tubing unit 12 as a train that moves together along the interior of the host pipeline P.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

OTHER STATEMENTS OF THE INVENTION

AA. A method of installing a liner comprising a polymer tube, the method comprising:

moving flexible tubing along an interior of a host pipeline;

operating a host pipeline preparation or inspection apparatus operatively connected to a distal end portion of the flexible tubing;

connecting the flexible tubing to a leading end of the liner; and pulling the liner into the host pipeline by the flexible tubing connected to the leading end of the liner.

AB. The method as set forth in claim AA, wherein said operating the host pipeline preparation or inspection apparatus comprises delivering fluid through the flexible tubing to the host pipeline preparation or inspection apparatus.

BA. A system for installing a liner comprising a polymer tube into a host pipeline, the system comprising:

a host pipeline preparation or inspection apparatus;

flexible tubing configured to be operatively connected to the host pipeline preparation or inspection apparatus to move the host pipeline preparation or inspection apparatus along an interior of the host pipeline and to facilitate operation of the host pipeline preparation or inspection apparatus, the flexible tubing being further configured to be connected to a leading end of the liner and for pulling the liner into the host pipeline as the flexible tubing is moved along the host pipeline.

BB. A system as set forth in claim BA further comprising a tubing management apparatus, the tubing management apparatus and flexible tubing being configured to push the host pipeline preparation apparatus the full length of the host pipeline.

CA. A method of installing a liner comprising a polymer tube, the method comprising:

delivering fluid in tubing to a sealed longitudinal section of a host pipeline to test hydrostatic pressure capacity of the longitudinal section of the host pipeline;

connecting the tubing to a leading end of the liner; and pulling the liner into the host pipeline by the tubing connected to the leading end of the liner.

DA. A system for installing a liner comprising a polymer tube into a host pipeline, the system comprising:

a hydrostatic testing seal configured to seal a longitudinal section of the host pipeline;

a source of pressurized fluid; flexible tubing configured to provide fluid communication from the source of pressurized fluid to the sealed longitudinal section of the host pipeline when the hydrostatic testing seal seals the longitudinal section of the host pipeline, the flexible tubing being further configured to be connected to a leading end of the liner and for pulling the liner into the host pipeline as the flexible tubing is moved along the host pipeline.

EA. A method of installing a liner comprising a polymer tube, the method comprising:

connecting flexible tubing to a leading end of the liner;

affixing a strain gauge on a pull head attached to the liner;

connecting a communication line extending along the flexible tubing to the strain gauge;

pulling the liner into the host pipeline by the tubing connected to the leading end of the liner; and while pulling the liner into the host pipeline, outputting a signal from the strain gauge representing strain on the liner to a control and/or monitoring device via the communication line extending along the flexible tube.

What is claimed is:

1. A method of moving a pipe rehabilitation object through a host pipe having a length, the method comprising:

moving the pipe rehabilitation object along the length of the host pipeline by applying a force to tubing connected to the pipe rehabilitation object, so that the tubing transfers the force applied to the pipe rehabilitation object causing the pipe rehabilitation object to move along the length of the host pipe; and delivering lubricant through the same tubing to which the force is applied to lubricate an inner surface of the host pipeline.

2. The method as set forth in claim 1, wherein said delivering the lubricant is performed simultaneously with said moving the pipe rehabilitation object.

3. The method as set forth in claim 1, wherein said delivering the lubricant is performed before said moving the pipe rehabilitation object.

4. The method as set forth in claim 1, wherein said moving the pipe rehabilitation object comprises pulling the pipe rehabilitation through the host pipe using the tubing.

5. The method as set forth in claim 4 wherein pulling the pipe rehabilitation object includes winding the tubing onto a reel.

6. The method as set forth in claim 1 wherein moving the pipe rehabilitation object comprises moving a liner into the host pipe.

7. The method as set forth in claim 6 further comprising affixing a strain gauge on a pull head attached to the liner, connecting a communication line extending along the flexible tubing to the strain gauge, pulling the liner into the host pipeline by the tubing connected to the leading end of the liner; and while pulling the liner into the host pipeline, outputting a signal from the strain gauge representing strain on the liner to a control and/or monitoring device via the communication line extending along the flexible tube.

8. The method as set forth in claim 1 wherein moving the pipe rehabilitation object comprises moving at least one of a pipe preparation apparatus and a pipe inspection apparatus.

9. A method of moving a pipe rehabilitation object through a host pipe, the method comprising:

moving the pipe rehabilitation object into a host pipeline by tubing connected to the pipe rehabilitation object;

delivering lubricant through the tubing to lubricate an inner surface of the host pipeline; and delivering fluid in the tubing to a sealed longitudinal section of a host pipeline to test hydrostatic pressure capacity of the longitudinal section of the host pipeline.

* * * * *